United States Patent

Bergkamp et al.

[11] Patent Number: 5,368,238
[45] Date of Patent: Nov. 29, 1994

[54] ADJUSTABLE ROTARY DRUM BALE CUTTER APPARATUS AND METHOD

[75] Inventors: Alan R. Bergkamp, Murdock; Richard E. Jacobs; Richard J. Pulliam, both of Harper, all of Kans.

[73] Assignee: DewEze Manufacturing, Inc., Harper, Kans.

[21] Appl. No.: 140,873

[22] Filed: Oct. 25, 1993

[51] Int. Cl.⁵ .................................................. B02C 23/02
[52] U.S. Cl. ...................................... 241/30; 241/223; 241/241; 241/243
[58] Field of Search ............... 241/30, 222, 223, 239, 241/241, 242, 243

[56] References Cited

U.S. PATENT DOCUMENTS

| | | | |
|---|---|---|---|
| 2,561,069 | 7/1951 | Peterson | 241/223 X |
| 2,670,775 | 3/1954 | Elofson | 241/239 X |
| 2,685,900 | 8/1954 | Cross | 241/223 X |
| 2,978,191 | 4/1961 | Kingery | 241/223 X |
| 3,101,759 | 8/1963 | Sterner et al. | |
| 3,208,491 | 9/1965 | Bliss | 241/223 X |
| 3,338,584 | 6/1968 | Gronberg | 241/239 X |
| 3,392,769 | 7/1968 | Grönberg | 241/239 X |
| 3,915,392 | 10/1975 | Kugler | |
| 3,979,074 | 9/1976 | White et al. | |
| 4,134,554 | 1/1979 | Morlock | |
| 4,266,899 | 5/1981 | Skeem | |
| 4,364,526 | 12/1982 | White | |
| 4,485,976 | 12/1984 | White | |
| 4,657,191 | 4/1987 | Dwyer et al. | |
| 4,693,426 | 9/1987 | White | |
| 4,732,332 | 3/1988 | Schitemaker | 241/241 X |
| 4,830,292 | 5/1989 | Frey | |
| 4,844,353 | 7/1989 | Houle | |
| 4,896,970 | 1/1990 | Schuler | |
| 4,923,128 | 5/1990 | Ostrowski | |
| 4,934,615 | 6/1990 | Osborne | |
| 4,951,883 | 8/1990 | Loppoli | |
| 5,090,630 | 2/1992 | Kopecky et al. | |

Primary Examiner—Timothy V. Eley
Attorney, Agent, or Firm—Litman, McMahon & Brown

[57] ABSTRACT

A horizontally oriented three sided frame is adapted to hold a round hay bale. An endless chain driven conveyor encircles the floor of the frame to cause the round bale to rotate about a longitudinal axis thereof while simultaneously urging a portion of the perimeter of the bale against a rotary drum cutter arrayed just above the floor on one side of the frame. The cutter chops the hay bale into individual strands for feeding to livestock. A spacer, commonly called a concave, is pivotably attached to the frame, and is spaced from and extends longitudinally along the top of the rotary drum. The spacing between the concave and the drum is adjustable. By adjusting this spacing, as well as the speed of rotation of the rotary drum and the speed of rotation of the round bale via the conveyor, the length of hay strands cut by the cutter is adjustable.

17 Claims, 3 Drawing Sheets

650 RPM DRUM SPEED

1600 RPM DRUM SPEED

ADJUSTABLE ROTARY DRUM BALE CUTTER APPARATUS AND METHOD

BACKGROUND OF THE INVENTION

1. Field of the Invention

This invention is directed to a round bale cutter apparatus with an improved rotary drum cutter for efficiently cutting large round hay bales into manageable quantities of hay which can be more easily fed to and consumed by feeding livestock. More particularly, the bale cutter includes an adjustable concave which is positioned adjacent the drum cutter so that the length of hay strands cut from the bale can be adjusted thereby.

2. Description of the Related Art

In the past, hay for feeding livestock was cut and baled into relatively small, rectangularly shaped hay bales which were usually stored indoors in barns or other storage buildings. When the hay was needed for feeding cattle, a desired number of these small hay bales were removed from storage, brought to the livestock and broken open for feeding.

This method of storing hay in small bales has been largely replaced by the use of large round bales weighing upwards of 2000 lbs each. Often these round bales are simply left in the field and are moved only as they are needed for feeding. A problem with such large bales is that, in relatively small livestock operations, the entire bale may not be needed for feed at any one time. Even in larger farming operations, a single bale may be sufficient to feed livestock in more than one location. Thus, these bales cannot simply be carried to the livestock and broken open as were the small rectangular bales in the past.

Generally, two feeding methods have developed for feeding round bales to livestock. In a first method, the bales are placed in fixed round bale feeders which are designed to give the livestock feeding access to the bale, but which protect the bale from being trampled or otherwise destroyed by the feeding livestock. With such a round bale feeder, the bale can remain in place for extended periods to feed surrounding livestock.

In a second method, an apparatus is used which cuts the round bale into manageable portions and distributes the cut hay along the ground or into feeding bins for livestock to reach. For specialized feeding operations, such as for dairy cattle, for example, the hay must generally be cut into short strands to be mixed with additives and other feed ingredients to promote optimum milk production. For feeding range cattle, on the other hand, the hay must be cut into longer strands and distributed along the ground for access by feeding cattle.

In the past, it was often necessary for a cattle feeding operation to employ two entirely different bale cutters. A first one of the bale cutters was often stationary and was designed to chop the hay to yield short strands of hay, as for feeding dairy cattle. The second bale cutter was mobile and was designed to cut and distribute longer strands of hay, as for range cattle. Clearly the requirement for two separate round bale cutters adds considerable expense to a cattle operation, both for initial purchase of the machines and for continuous maintenance.

One prior art apparatus for chopping round hay bales is described in U.S. Pat. No. 4,693,426 to White. A tub tilted to an angle of 35° to 50° from horizontal is rotated past a number of rows of conventional sickle cutters. A round hay bale contained in the tub is cut by the sickle cutters as the tub is rotated. This round bale chopper is designed particularly for short strand cutting since the rate at which the bale is fed to the cutters can be precisely controlled.

The White apparatus and similar tilted tub choppers are complex and expensive pieces of machinery which are unnecessary for the cutting of round bales into longer strands of hay for feeding range cattle or the like, as explained above. Furthermore, these and other round bale cutters have often employed conventional sickle bar cutters which were originally designed for use in cutting standing crops. These conventional sickle bar cutters achieve marginal performance when attempting to cut something as dense as a round hay bale.

It is clear then, that a need exists for a relatively simple and efficient machine for chopping round hay bales into manageable hay strands for feeding livestock. Such a machine should be capable of rapidly chopping a large round bale into strands of hay, but should be simpler and less expensive than known tilted tub choppers. Such a machine should preferably be adjustable so that hay strands of varying lengths, e.g. from 2" to 10", can be cut depending upon the feeding application.

SUMMARY OF THE INVENTION

In the practice of the present invention, a round bale cutter includes a horizontally oriented three sided frame which is adapted to hold a round hay bale on an elevated floor. A bale conveyor includes a pair of endless chains which drive a series of longitudinally extending slats across the floor of the frame and the slats grasp and rotate the round bale about a longitudinal axis. At the same time, the slats urge a portion of the bale perimeter against a rotary drum cutter arrayed just above the floor on one side of the frame. The drum cutter includes a plurality of knives arrayed along it surface. The drum is also rotated, but at a much higher speed than the bale, causing the knives to chop the hay bale into manageable portions for livestock feed. A spacer or concave is arrayed above the rotary drum and is pivotably attached to one side of the frame. The concave includes a plurality of spacer teeth arranged along its length and is pivotably adjustable through an arc to vary the distance of the concave from the drum and therefore the spacing between the spacer teeth and the cutting knives. By varying this distance, the rotating speed of the drum, and the speed of the conveyor slats which propel the round bale, the length of hay strands yielded by the cutter can be made to vary from approximately 2" to 10".

OBJECTS AND ADVANTAGES OF THE INVENTION

The principle objects and advantages of the present invention include: to provide an improved rotary drum bale cutter apparatus; to provide such an apparatus in which a round hay bale can be rapidly and efficiently chopped into manageable portions for efficiently feeding livestock; to provide such an apparatus in which a round bale is placed in a frame where it is rotated about a longitudinal axis while being urged against a rotary drum cutter; to provide such an apparatus in which a concave is attached to the frame and is positioned above the rotary drum; to provide such an apparatus in which the concave is pivotably adjustable relative to the rotary drum so as to adjust the lengths of hay strands cut by the bale cutter; to provide a method of adjusting a round bale cutter to yield varying lengths of hay strands; and to provide such an apparatus which is reliable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

1. Introduction and Environment

Figure 1:
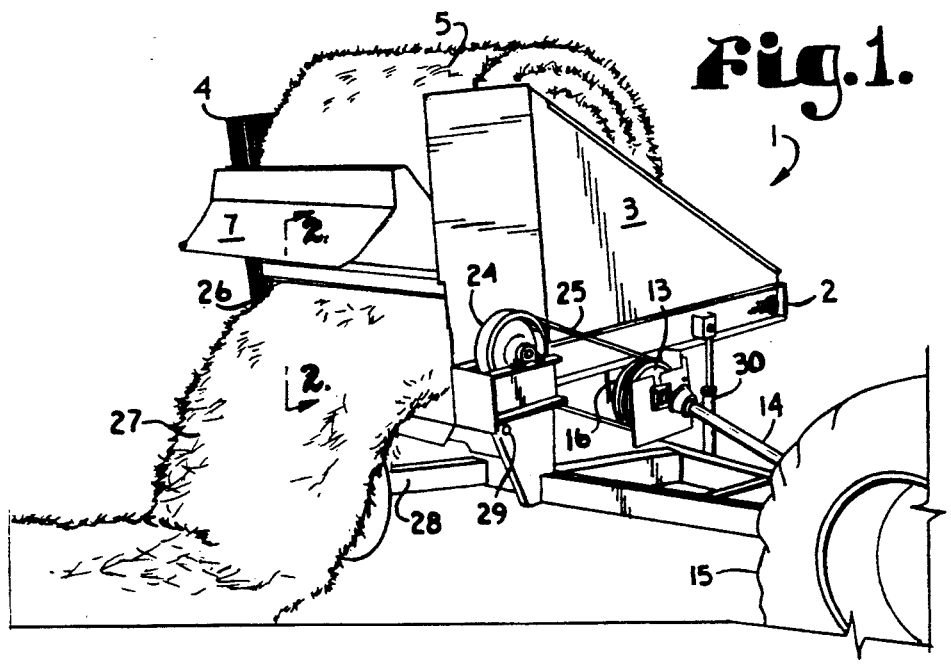
FIG. 1 is a perspective view of a rotary drum round bale cutter in accordance with the present invention, shown cutting a round bale into individual hay strands.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly" "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

2. Round Bale Cutter

Referring to the drawings in more detail the reference numeral 1 in FIG. 1 generally designates a rotary drum bale cutter in accordance with the invention. A frame 2 includes two opposing triangular-shaped end walls 3 and 4. The frame 2 is open at one side for loading of round hay bales, such as the bale 5. The opposite side includes a slanted wall 6, with a projecting guard portion 7 which deflects cut hay strands downward.

Figure 3:
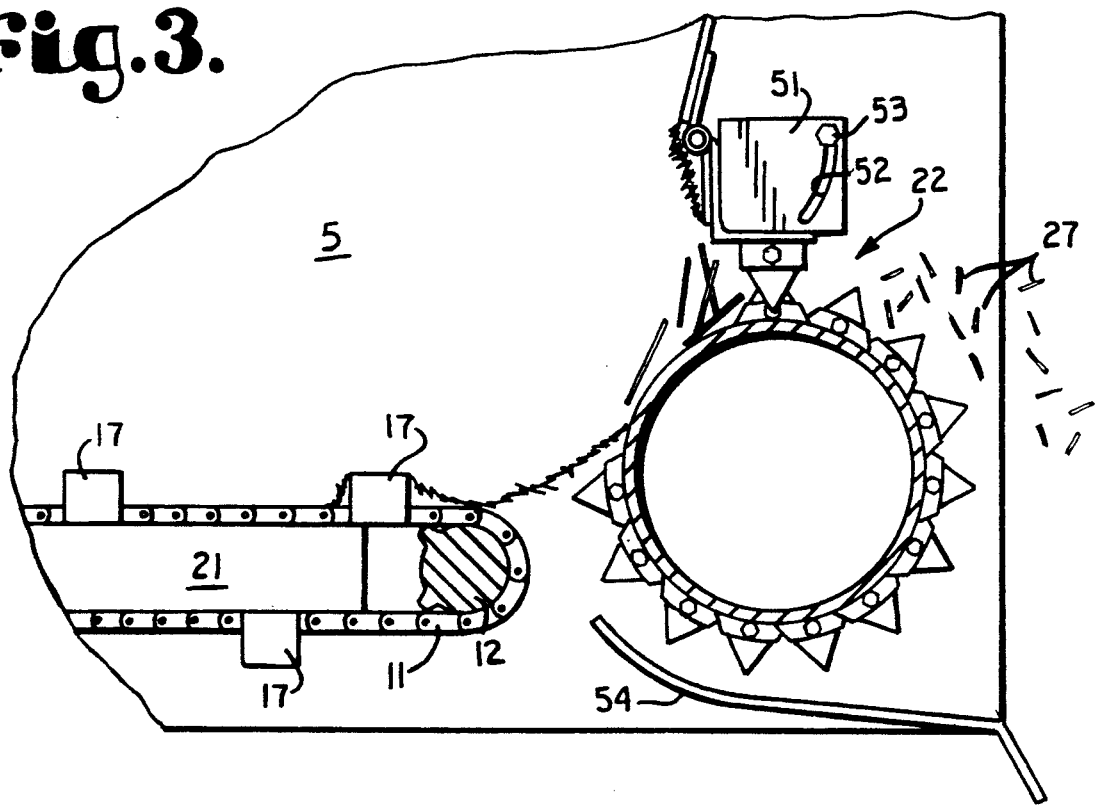
FIG. 3 is an enlarged, fragmentary, cross-sectional view of the bale cutter, taken along line 3—3 of FIG. 2, and illustrating the concave pivoted to a down position close to the rotary drum with the cutter cutting relatively short length hay strands.
Figure 4:
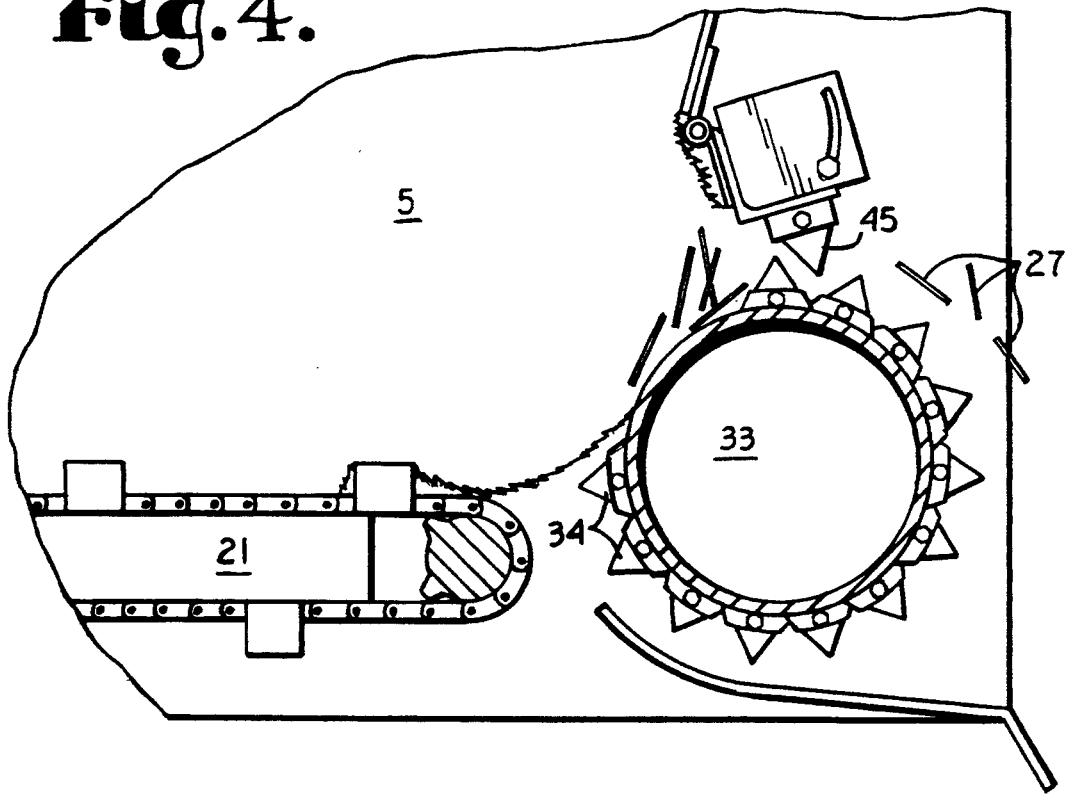
FIG. 4 is an enlarged, fragmentary, cross-sectional view of the bale cutter, taken along line 3—3 of FIG. 2, and illustrating the concave pivoted upward and away from the rotary drum with the cutter cutting relatively longer length hay strands.

Within the frame 2, an endless chain 11 (FIG. 3) is driven in a loop by a sprocket 12 which is, in turn, driven by a first pulley 13 attached to a power take off shaft 14 on a tractor 15. The speed of the sprocket 12 is infinitely variable in a conventional manner via a hydraulic drive unit 16. A number of longitudinally extending slats 17 are attached to the chain 11. The chain 11 drives the slats 17 clockwise, as shown in FIGS. 3 and 4, in a loop over a floor 21 of the cutter 1, and returns them beneath the floor 21. The slats 17 are similarly connected to a matching endless chain (not shown) at the opposite end of the cutter 1. As the slats 17 move over the floor 21, they grasp the bale 5 and rotate it clockwise, again as shown in FIGS. 3 and 4, while urging the bottom portion of the bale 5 against a rotary drum cutter 22.

The rotary drum cutter 22 extends longitudinally along the base of the slanted wall 6 and is attached to a rotatable drive shaft 23. The shaft 23 is connected to a second pulley 24 which is connected via a drive belt 25 to the first pulley 13. The slanted wall 6 is held in place above the floor 21, leaving a slot 26 between the slanted wall 6 and the floor 21. As the hay bale 5 is rotated past the rotary drum cutter 22, the cutter 22 cuts the bale 5 into individual strands of hay 27 which exit the slot 26, as shown in FIG. 3.

The entire frame 2 is pivotably attached to a wheeled carriage 28 via a hinge 29. A pair of hydraulic lifting cylinders 30, of which only one is shown in FIG. 1, are attached between one side of the carriage 29 and the open side of the frame 2, as shown in FIG. 1. The hydraulic lifting cylinders 30 serve to selectively lift the open side of the frame 2, as shown in FIG. 1. This allows the center of gravity of the bale 5 to be positioned over the rotary cutter 22 for more efficient cutting.

3. Rotary Drum Cutter

Figure 2:
FIG. 2 is an enlarged, fragmentary, cross-sectional view of the bale cutter of FIG. 1, taken along line 2—2 of FIG. 1, and illustrating a rotary drum and concave.

Referring to FIGS. 2-4, the rotary drum cutter 22 includes a cylindrical drum 33 upon which are mounted a plurality of cutting knives 34, with the knives 34 spaced longitudinally and radially about the drum 33. The drum 33 is bolted to the drive shaft 23 via a pair of end plates 35, only one of which is pictured in FIG. 2. The drive shaft 23 extends through the end wall 3 where it is attached to the pulley 24 and is supported by a pair of bearings 41 and 42. The speed of the drive shaft 23 can be changed between two or more speeds by changing the sizes of the first and second pulleys 13 and 24, respectively, and the length of the drive belt 25. Nominal shaft rotation speeds available in the preferred embodiment are 650 RPM and 1600 RPM.

A spacer element, commonly called a concave 43 is hingedly attached to the base of the slanted wall 6 via a piano style hinge 44. The concave 43 includes a plurality of spacer teeth 45 arranged at regular intervals along its length. Each spacer tooth 45 is positioned between a respective pair of the cutting knives 34. The spacing between the concave 43 and the drum 33 is variable by pivoting the concave 43 relative to the slanted wall 6. A pair of adjustment plates 51, only one of which is shown, are welded or otherwise attached to either end of the concave 43. Each plate 51 includes an arcuate slot 52 through which a bolt 53 extends. The bolts 53 are threaded into respective end walls 3 and 4, and, when tightened, serve to hold the concave 43 in a selected pivoted position. A curved guard 54, as shown in FIGS.

3 and 4, is positioned beneath the drum 33 to prevent clogging of the cutter 22 by dust and debris.

FIG. 3 illustrates the concave 43 pivoted to a down position wherein the spacer teeth 45 are aligned with the cutting knives 34. In this position, the distance between the spacer teeth and the cutting knives is at a minimum and the hay strands 27 will be cut into the smallest possible lengths consistent with a selected drum and slat speed. This position is suitable for creating silage which will be mixed with other feed for stationary feeding of cattle in a dairy, a feed lot, etc.

FIG. 4 illustrates the concave 43 pivoted outward, increasing the distance between respective cutting knives 34 and spacer teeth 45 to a maximum, thus cutting the hay strands 27 into the longest possible lengths consistent with a selected drum and slat rotation speed.

4. Performance

Figure 5:
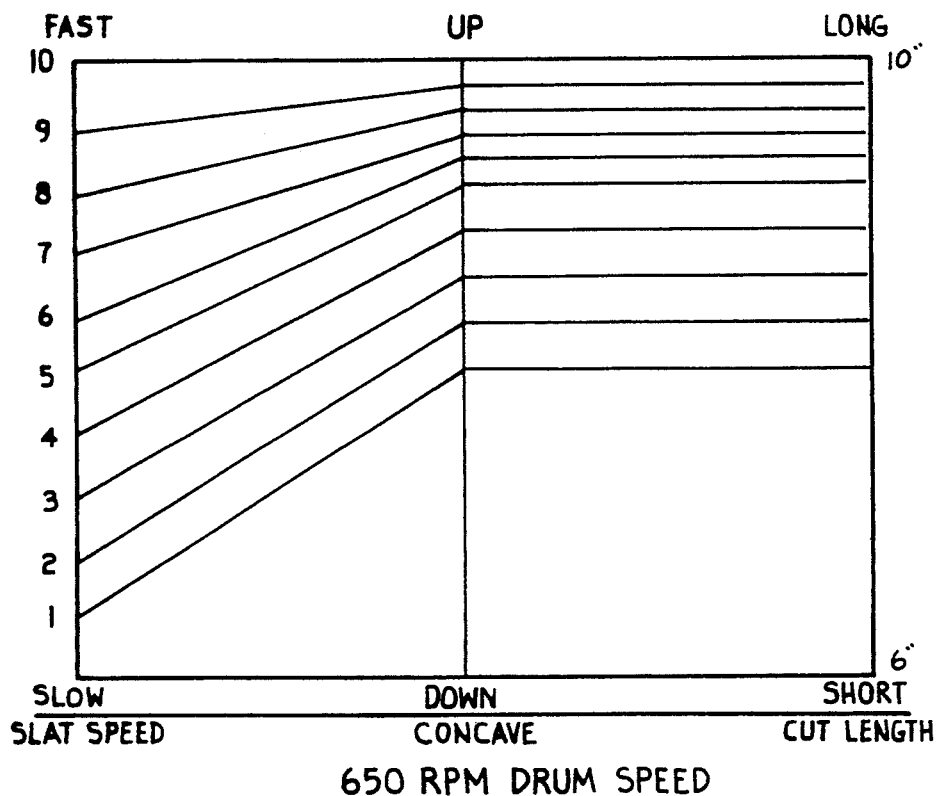
FIG. 5 is a graph illustrating the relationship between slat speed, concave position and hay strand length with the rotary drum rotating at 650 RPM.
Figure 6:
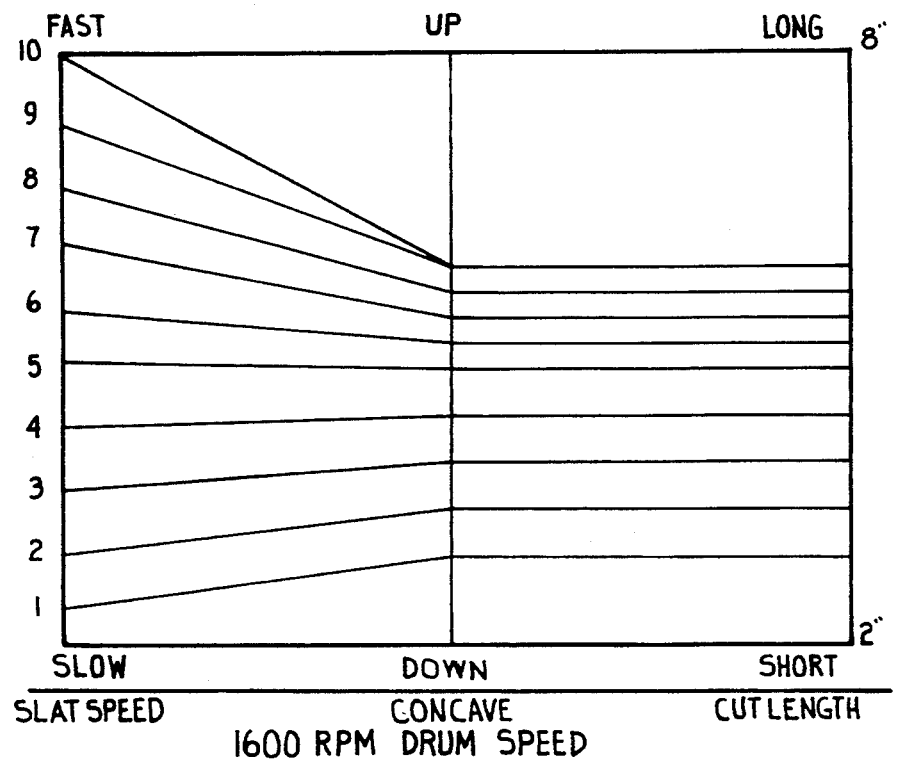
FIG. 6 is a graph illustrating the relationship between slat speed, concave position and hay strand length with the rotary drum rotating at 1600 RPM.

FIG. 5 is a graph illustrating the relationship between the speed of the bale rotating slats 17, on a scale from a minimum of 1 to a maximum of 10, the positioning of the concave 43, and the length of cut hay strands 27, at a drum speed of 650 RPM. FIG. 6 is a second graph illustrating the same relationships with a drum speed of 1600 RPM.

Referring to FIGS. 5 and 6, it is apparent that strand length can be varied from about 2" to 10" by varying drum speed, concave position and slat speed. It is also apparent that the effect of varying concave position is different with each slat and drum speed. For example, referring to FIG. 5, at a drum speed of 650 RPM and a slat scale speed of 1, i.e. the slowest bale rotation speed, varying concave spacing from a minimum to a maximum will vary strand length from about 6.5" to about 8". On the other hand, as shown in FIG. 6, with a drum speed of 1600 RPM and a slat scale speed of 1, varying concave spacing from a minimum to a maximum will only vary strand length from about 2.5" to about 3". It is also clear from FIG. 5 that, at the slower drum speed of 650 RPM, the effect of concave spacing is more pronounced at the lower bale rotation or slat speeds. By contrast, from FIG. 6, at the higher drum speed of 1600 RPM, the effect of concave spacing is more pronounced at the higher slat or bale rotation speeds.

Thus, by varying the slat speed, concave spacing, and drum speed, hay strand length can be varied to accommodate the desired use from short lengths for silage to mix with other feeds for stationary feeding to long lengths for distributing to range cattle in the field.

The result is an extremely versatile round bale cutter which can obviate the need for multiple bale cutters for different applications.

It is to be understood that while certain forms of the present invention have been illustrated and described herein, it is not to be limited to the specific forms or arrangement of parts described and shown.

What is claimed and desired to be secured by Letters Patent is as follows:

1. A method of adjusting the length of strands of hay cut from a round bale by a round bale rotary drum cutter, said cutter including a frame for holding said round hay bale, said frame including a bottom portion and a frame side wall spaced from said bottom portion to leave a slot therebetween, a conveyor means for rotating said round hay bale about a longitudinal axis thereof while simultaneously urging a portion of the perimeter of said round hay bale against a rotary drum with a plurality of cutting knives extending radially outward therefrom, said drum being positioned so that said knives extend at least partially through said slot to contact said round bale, and a spacer means pivotably attached to said side wall of said frame above said slot, said spacer means being arrayed longitudinally along and spaced from said drum, said method comprising the step of:

(a) selectively adjusting the spacing of said spacer means relative to said rotary drum by pivoting said spacer means relative to said side wall.

2. A method as in claim 1, and further including the step of:

(a) selectively adjusting the speed of rotation of said rotary drum.

3. A method as in claim 1, and further including the step of:

(a) selectively adjusting the speed of rotation of said bale by said conveyor means.

4. A method as in claim 1, and further including the steps of:

(a) selectively adjusting the speed of rotation of said bale by said conveyor means and
   (b) selectively adjusting the speed of rotation of said rotary drum.

5. A rotary drum round bale cutter comprising:

(a) a frame sized to accommodate a round hay bale, said frame including a frame bottom and a side wall, said side wall being spaced from said frame bottom to leave a slot therebetween;
   (b) a drum rotatably mounted to said frame, said drum being oriented with its longitudinal rotational axis outside of and along said slot, said drum having an outer curved surface;
   (c) drum rotation means for rotating said drum;
   (d) a plurality of cutting knives attached to said drum, each said knife being attached to the outer curved surface of said drum such that said knives, when said drum is rotated, extend through said slot and contact said round bale; and
   (e) spacer means arrayed longitudinally along said drum above said slot, said spacer means including a plurality of teeth arrayed along the length thereof, each said tooth being positioned to interact with one of said knives.

6. A rotary drum cutter as in claim 5, wherein:

(a) each of said plurality of spacer teeth is positioned between a respective pair of said knives.

7. A rotary drum cutter as in claim 5, wherein:

(a) said spacer means is pivotably attached to said frame side wall.

8. A rotary drum cutter as in claim 5, wherein:

(a) said spacer means includes means for pivotally adjusting the spacing of said spacer means from said rotary drum.

9. A rotary drum cutter as in claim 7, wherein said round bale cutter comprises:

(a) bale rotation means for rotating said round hay bale about a longitudinal axis while simultaneously urging a portion of the perimeter of said round hay bale against said rotary drum.

10. A rotary drum cutter as in claim 9, wherein said bale rotation means comprises:

(a) a plurality of slats extending between a pair of endless chains; and
   (b) driving means for driving said endless chains and said attached slats in a loop about a floor of said frame to thereby rotate said bale via said slats.

11. A rotary drum cutter as in claim 10, wherein said bale rotation means further comprises:

(a) means for selectively varying the speed of said driving means.

12. A rotary drum cutter as in claim 5, and further comprising:
(a) means for selectively varying the speed of rotation of said drum rotation means.

13. A round hay bale cutter for cutting a round hay bale into individual hay strands, said round bale cutter comprising:
(a) frame means for holding said round hay bale, said frame means including a frame bottom and a side wall, said side wall being spaced from said frame bottom to leave a slot therebetween;

14. A rotary drum cutter as in claim 13, wherein:
(a) each of said plurality of spacer teeth is positioned between a respective pair of said knives.

15. A round hay bale cutter as in claim 13, wherein:
(a) said spacer means includes means for pivotally adjusting the spacing of said spacer means from said rotary drum.
(b) bale rotation means for rotating said round hay bale about a longitudinal axis thereof while simultaneously urging a portion of the perimeter of said round hay bale against a rotary drum cutter, said rotary drum cutter comprising:
 (i) a drum rotatably attached to said frame, said drum being oriented with its longitudinal rotational axis outside of and along said slot;
 (ii) drum rotation means for rotating said drum; and
 (iii) a plurality of cutting knives attached to and extending from an outer surface of drum; and
(c) spacer means pivotally attached to said frame side wall above said slot and arrayed longitudinally along and spaced from said drum, said spacer means including a plurality of teeth, each said tooth being positioned to interact with at least one of said knives.

16. A round hay bale cutter as in claim 13, wherein said bale rotation means comprises:
(a) means for selectively varying its speed of rotation.

17. A round hay bale cutter as in claim 13, and further comprising:
(a) means for selectively varying the speed of rotation of said drum rotation means.

* * * * *